US007817388B2

(12) United States Patent
Chiu et al.

(10) Patent No.: US 7,817,388 B2
(45) Date of Patent: Oct. 19, 2010

(54) LATCH-UP PROTECTION CIRCUIT FOR LCD DRIVER IC

(75) Inventors: Ming-Cheng Chiu, Sinshih Township, Tainan County (TW); Jeh-Chuen Chen, Sinshih Township, Tainan County (TW)

(73) Assignee: Himax Technologies Limited (TW)

( * ) Notice: Subject to any disclaimer, the term of this patent is extended or adjusted under 35 U.S.C. 154(b) by 436 days.

(21) Appl. No.: 12/057,240

(22) Filed: Mar. 27, 2008

(65) Prior Publication Data

US 2009/0244799 A1 Oct. 1, 2009

(51) Int. Cl.
*H02H 9/00* (2006.01)

(52) U.S. Cl. ........................................................ 361/56

(58) Field of Classification Search .................... 361/56
See application file for complete search history.

(56) References Cited

U.S. PATENT DOCUMENTS 7,061,291 B2 * 6/2006 Jacobs et al. ................ 327/170
7,385,578 B2 * 6/2008 Chang et al. .................. 345/87
7,528,672 B2 * 5/2009 Darrer et al. ................ 331/158
2003/0085664 A1 * 5/2003 Bae ......................... 315/169.1
2005/0052209 A1 * 3/2005 Jacobs et al. ................ 327/170
2005/0227396 A1 * 10/2005 Chang et al. .................. 438/30
2006/0066252 A1 * 3/2006 Kim ........................ 315/169.3
2007/0103826 A1 * 5/2007 Hung et al. ................... 361/56

* cited by examiner

*Primary Examiner*—Ronald W Leja
(74) *Attorney, Agent, or Firm*—Hayes Soloway P.C.

(57) ABSTRACT

A latch-up protection circuit for LCD driver is provided. The latch-up protection circuit for LCD driver comprises an NMOS, a switch and a capacitor. The NMOS comprises a drain electrically connected to a ground; a source electrically connected to a negative voltage source; and a gate. The switch is electrically connected to the gate to receive a control signal, wherein the switch switches between a positive voltage source and the negative voltage source according to the control signal; and the capacitor is electrically connected to the positive voltage source and the gate.

7 Claims, 2 Drawing Sheets

LATCH-UP PROTECTION CIRCUIT FOR LCD DRIVER IC

BACKGROUND

1. Field of Invention

The present invention relates to a latch-up protection circuit for LCD driver IC. More particularly, the present invention relates to a latch-up protection circuit for LCD driver IC comprising an NMOS, a switch and a capacitor.

2. Description of Related Art

The design of the LCD driver IC in the electronic devices is an important issue. Different design styles result in different area sizes, different costs and different performances. Thus, the overall performance of an driver IC highly depends on the design of the driver IC.

The driver IC are easy to suffer from the effect of the noise signal, e.g. electrostatic discharge or rush current. The noise or rush current will make the potential of some parts of the circuit become an extremely high positive voltage level. The high positive voltage level results in the latch-up of the circuit and further results in the malfunction of the circuit. The conventional design of the latch-up protection circuit for LCD driver IC is to use an external schottky diode to connect to a most negative part of the p-substrate of the driver IC that may suffer from the electrostatic discharge and limit these parts of the driver IC in a certain voltage level. But in order to make the production cost down, an electric circuit with less external elements is preferred.

Accordingly, what is needed is a new design of the latch-up protection circuit that can be adapted in the LCD driver IC to prevent the electric circuit from the noise or rush current to overcome the above issues. The present invention addresses such a need.

SUMMARY

A latch-up protection circuit for LCD driver IC is provided. The latch-up protection circuit comprises an NMOS, a switch and a capacitor. The NMOS comprises a drain electrically connected to a ground; a source electrically connected to a negative voltage source; and a gate. The switch is electrically connected to the gate to receive a control signal, wherein the switch switches between a positive voltage source and the negative voltage source according to the control signal; and the capacitor is electrically connected to the positive voltage source and the gate.

It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiment, with reference made to the accompanying drawings as follows.

DETAILED DESCRIPTION

Figure 1:
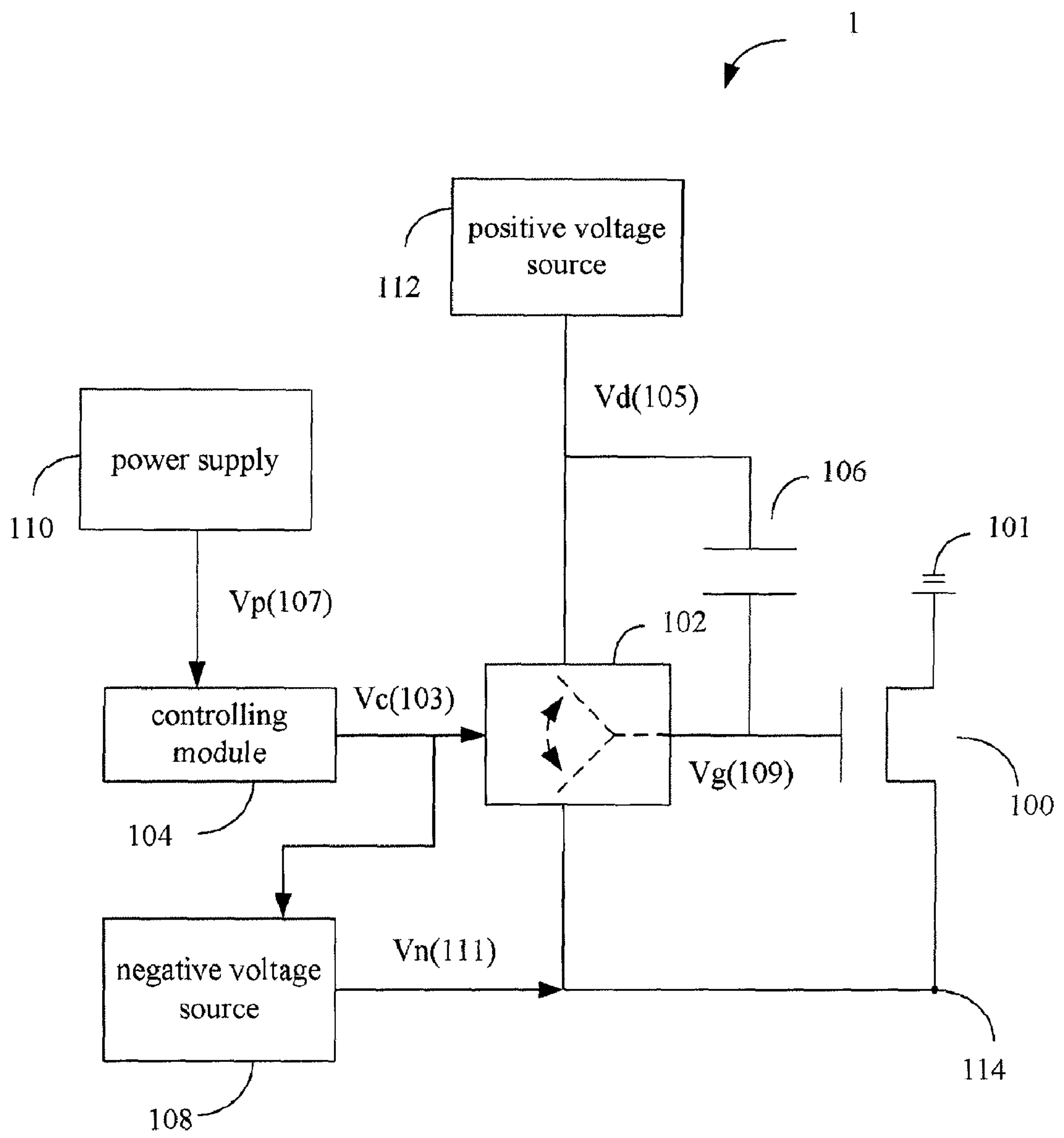
FIG. 1 is a diagram of a latch-up protection circuit for LCD driver IC of the first embodiment of the present invention.

Reference will now be made in detail to the present embodiments of the invention, examples of which are illustrated in the accompanying drawings. Wherever possible, the same reference numbers are used in the drawings and the description to refer to the same or like parts.

Please refer to FIG. 1, a diagram of a latch-up protection circuit 1 for LCD driver IC (not shown). The latch-up protection circuit 1 comprises an NMOS 100, a switch 102, a controlling module 104 and a capacitor 106. The NMOS 100 comprises a drain electrically connected to a ground potential 101, a source electrically connected to a negative voltage source 108 and a gate. In the present embodiment, the point of an driver IC (not shown) under the threaten of the noise or rush current effect is connected to the source of the NMOS 100, i.e. the connection point 114, of the latch-up protection circuit 1.

The controlling module 104 is to generate a control signal 103 after the controlling module 104 receives a supply voltage from a power supply 110. The switch 102 is electrically connected to the gate of the NMOS 100. The switch 102 receives the control signal 103, wherein the switch 102 switches between a positive voltage source 112 and the negative voltage source 108 according to the control signal 103. The capacitor 106 is electrically connected to the positive voltage source 112 and the gate of the NMOS 100.

Figure 2:
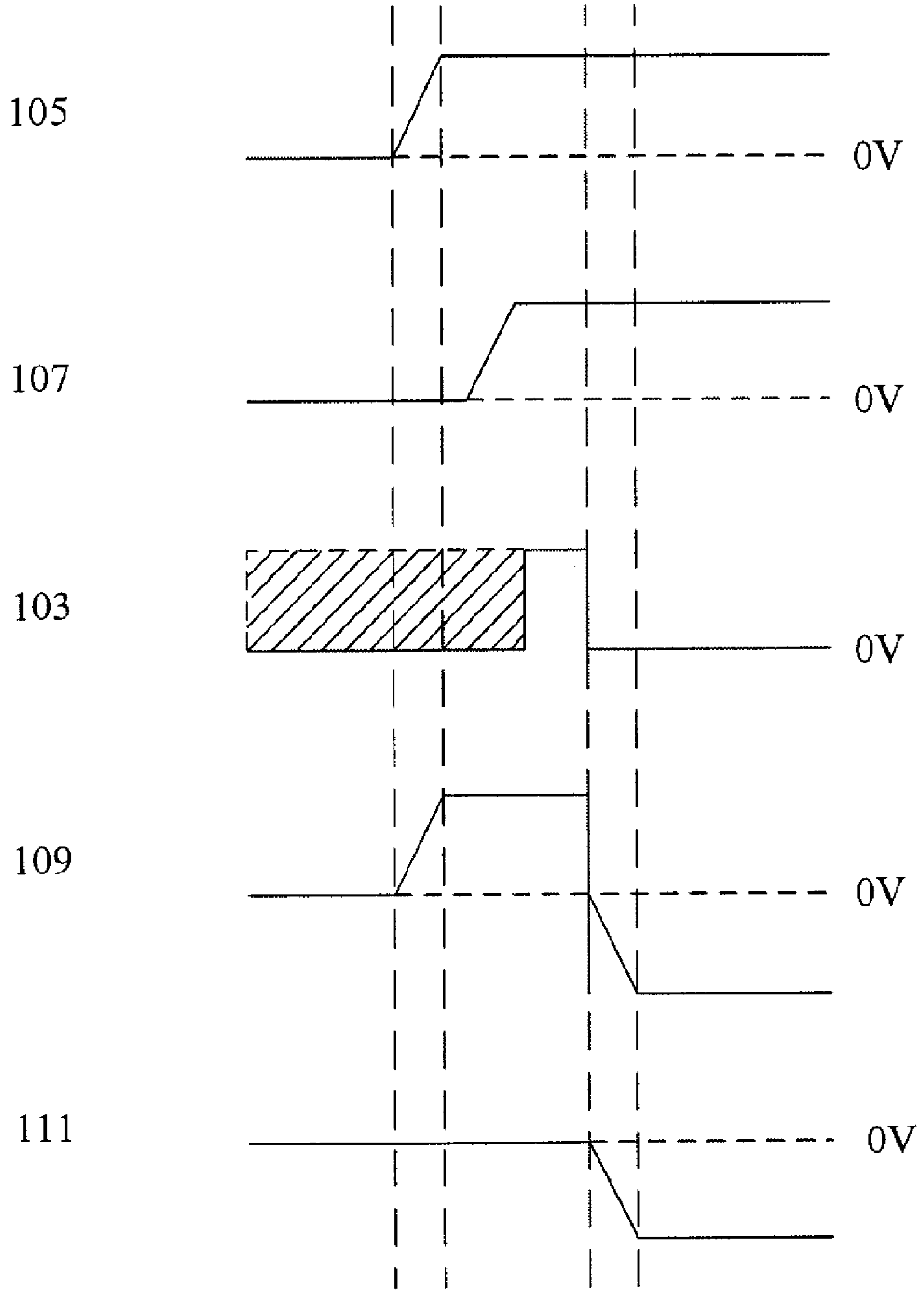
FIG. 2 is a diagram of the waveform of the control signal, a positive voltage, a supply voltage, a gate voltage and a negative voltage.

Please refer to FIG. 2, a diagram of the waveform of the control signal 103, a positive voltage 105, a supply voltage 107, a gate voltage 109 and a negative voltage 111. The operation of the latch-up protection circuit 1 is described as follow. At first, the positive voltage source 112 starts to provide a positive voltage 105 to the capacitor 106 and keeps charging the capacitor 106. At the same time, the driver IC to be protected (not shown) hasn't started to operate, and the controlling module 104 hasn't received the supply voltage 107 from the power supply 110 either. The capacitor 106 charged by the positive voltage source 112 provides a gate voltage 109 to the gate of the NMOS 100 and makes the NMOS 100 turn on. Thus, the source of the NMOS 100, i.e. the connection point 114, approaches to the ground potential 101. The turn-on of the NMOS 100 keeps the source of the NMOS 100 at the ground potential. Therefore, the noise or rush current can't make the voltage level of the source rise before the power supply 110 provides the supply voltage 107 to the controlling module 104.

After a period of time, the power supply 110 starts to provide the supply voltage 107 to the controlling module 104 and the driver IC to be protected (not shown) starts to operate as well. The controlling module 104 then generates the control signal 103 to control the switch 102. In the present embodiment, the switch 102 connects to the positive voltage source 112 first according to the high state of the control signal 103, and the NMOS 100 keeps turning on and the voltage of the source still approaches to the ground potential. The control signal 103 then switches to low state to make the switch 102 connect to the negative voltage source 108. The source and the gate of the NMOS 100 simultaneously receive the negative voltage 111 provided by the negative voltage source 108. In the present embodiment, the negative voltage 111 provided by the negative voltage source 108 is the most negative voltage level in the LCD driver IC. Thus, the NMOS 100 turns off, and the source is isolated from the ground potential. The level of the negative voltage 111 provided by the negative voltage source 108 is high enough to prevent the source of the NMOS 100, i.e. the connection point 114, from the positive high voltage caused by noise or rush current.

The latch-up protection circuit of the present invention provides a mechanism to keep the source of the NMOS, i.e. the point to be protected in an LCD driver IC away from the effect of noise or rush current. Before the driver IC starts to operate, the latch-up protection circuit keeps the source of the NMOS at ground potential. After the driver IC starts to operate, the latch-up protection circuit makes the source at a high negative voltage. Thus, the noise or rush current won't damage the driver IC in both situations.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A latch-up protection circuit for LCD driver IC comprising:

an NMOS comprising:

a drain electrically connected to a ground;

a source electrically connected to a negative voltage source; and a gate;

a switch electrically connected to the gate for receiving a control signal, wherein the switch switches between a positive voltage source and the negative voltage source according to the control signal; and a capacitor electrically connected to the positive voltage source and the gate.

2. The latch-up protection circuit for LCD driver IC of claim 1, further comprising a controlling module for generating the control signal after the controlling module receives a supply voltage from a power supply.

3. The latch-up protection circuit for LCD driver IC as claim 2, wherein the positive voltage source keeps charging the capacitor before the controlling module receives the supply voltage.

4. The latch-up protection circuit for LCD driver IC of claim 1, when the switch connects to the positive voltage source according to the control signal, the NMOS turns on and a voltage of the source approaches to the ground potential.

5. The latch-up protection circuit for LCD driver IC of claim 1, when the switch connects to the negative voltage source according to the control signal, the NMOS turns off and the source receives the negative voltage from the negative voltage source.

6. The latch-up protection circuit for LCD driver IC of claim 5, wherein the negative voltage source provides the negative voltage according to the control signal.

7. The latch-up protection circuit for LCD driver IC of claim 6, the negative voltage is the most negative voltage level of the LCD driver IC.

* * * * *